United States Patent [19]

Wang et al.

[11] 4,414,660
[45] Nov. 8, 1983

[54] HIGH DENSITY INFORMATION DISC

[75] Inventors: Chih C. Wang, Hightstown; Ronald F. Bates, Trenton, both of N.J.

[73] Assignee: RCA Corporation, New York, N.Y.

[21] Appl. No.: 408,021

[22] Filed: Aug. 13, 1982

[51] Int. Cl.³ .......................... C07F 7/18; G11B 3/70
[52] U.S. Cl. .................... 369/286; 346/135.1; 346/137; 358/342; 369/288; 428/64; 428/161; 428/408; 428/447; 428/451; 556/425
[58] Field of Search ............... 369/288, 286; 556/425; 358/128.5; 346/137, 135.1; 428/64, 447, 451, 408, 161

[56] References Cited
U.S. PATENT DOCUMENTS

| 3,833,408 | 9/1974 | Matthies | 117/217 |
| 4,275,101 | 6/1981 | Wang et al. | 369/286 |
| 4,340,629 | 7/1982 | Hillenbrand et al. | 428/64 |
| 4,342,659 | 8/1982 | Wang et al. | 252/49.6 |
| 4,342,660 | 8/1982 | Berry et al. | 252/49.6 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/286 X |

*Primary Examiner*—Bernard D. Pianalto
*Attorney, Agent, or Firm*—Birgit E. Morris

[57] ABSTRACT

High density information discs comprising conductive carbon loaded polyvinylchloride discs are lubricated with a fractionated methyl alkyl siloxane lubricant which contains an alkylene oxide silicone copolymer additive.

5 Claims, 2 Drawing Figures

HIGH DENSITY INFORMATION DISC

This invention relates to an improved high density information disc lubricant. More particularly, this invention relates to an improved high density information disc lubricant containing alkylene oxide silicone copolymers.

BACKGROUND OF THE INVENTION

U.S. Pat. No. 3,833,408 to Matthies, herein incorporated by reference, describes the application of methyl alkyl siloxane compositions as lubricants for conductive information discs comprising a molded plastic disc having audio and video signal information in the form of geometric variations in a spiral groove. These discs are coated first with a conductive material which acts as a first electrode of a capacitor, then with a dielectric layer and a final layer of lubricant. A metallized stylus acts as a second electrode of the capacitor. The information signals are monitored by the stylus which notes changes in capacitance between the stylus and the disc surface as the information signals, in the form of a surface relief pattern, pass beneath the stylus.

Further developments in this system have produced a disc which is made of a conductive plastic material, e.g., a polyvinylchloride homopolymer or copolymer resin containing sufficient amounts of conductive carbon particles so that the disc can provide capacitance readout. The plastic resin at the surface of the disc surrounds the carbon particles to produce a dielectric surface layer. This development has eliminated the need for separate coatings of metal and a dielectric layer on the surface of the disc.

The stylus, formerly made of metallized sapphire, has also been improved so that metallized diamond can be used. Diamond is a harder, longer wearing material than sapphire but also requires improved lubrication of the disc surface.

High density information discs are also being developed which do not require a conductive surface or a grooved surface, the stylus being maintained in synchronization with the information pattern track by means of electrical signals rather than by the groove walls.

These changes in the materials used for the high density information discs and the stylus have changed the requirements for the lubricant system and improved lubricants were required. Wang et al, in U.S. Pat. No. 4,275,101, have described an improved lubricant system which comprises a fractionated, purified methyl alkyl siloxane of the formula

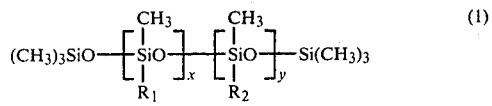

(1)

wherein $R_1$ and $R_2$ are alkyl groups of 4–20 carbon atoms, x is an integer of 2–4 and y is an integer of 0–2 and wherein the sum of x and y is 4 or less. These lubricants have improved long term stability and resistance to temperature and relative humidity changes in the atmosphere.

High density information discs of the above type are subject to a phenomenon called carrier distress. Since the polyvinylchloride composition from which the discs are made is a heavily filled, heavily lubricated and heavily plasticized composition, degradation products that are produced during molding and on storage from reactions of the disc materials and excess, incompatible additives, bleed to the surface of the disc, forming a thin layer of organic and inorganic materials. This layer interferes with playback by collecting in the grooves and by building up on the stylus. The result can be locked grooves, or dropouts of information as the disc is played. This problem has been somewhat alleviated by cleaning the discs after molding and prior to lubrication with aqueous solutions which remove at least some of the surface layer. However, with time, additional materials bleed to the surface of the disc. This bleedout can be accelerated by exposure of the disc to high temperatures, on the order of about 100° F., and high relative humidity, 90 percent and above. Lubrication of the disc alone has had little or no effect on reducing carrier distress. However, it would be highly desirable to be able to reduce carrier distress by means of a permanent layer on the disc surface.

SUMMARY OF THE INVENTION

We have found that carrier distress of high density information discs, after exposure of the discs to high temperature and high relative humidity, is considerably reduced when methyl alkyl siloxane lubricants, doped with alkylene oxide silicone copolymers, are applied to the surface of the discs.

DETAILED DESCRIPTION OF THE INVENTION

The alkylene oxide silicone copolymers useful in the present invention are liquids of the formula

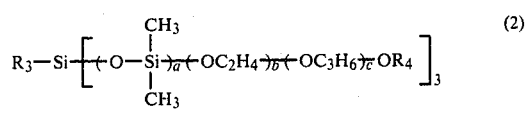

(2)

wherein $R_3$ and $R_4$ are lower alkyls, e.g., C-1 to C-5, a is an integer of 1–2, b is an integer of 0–2 and c is an integer of 1–6. Mixtures of the above compounds can also be employed.

Figure 1:
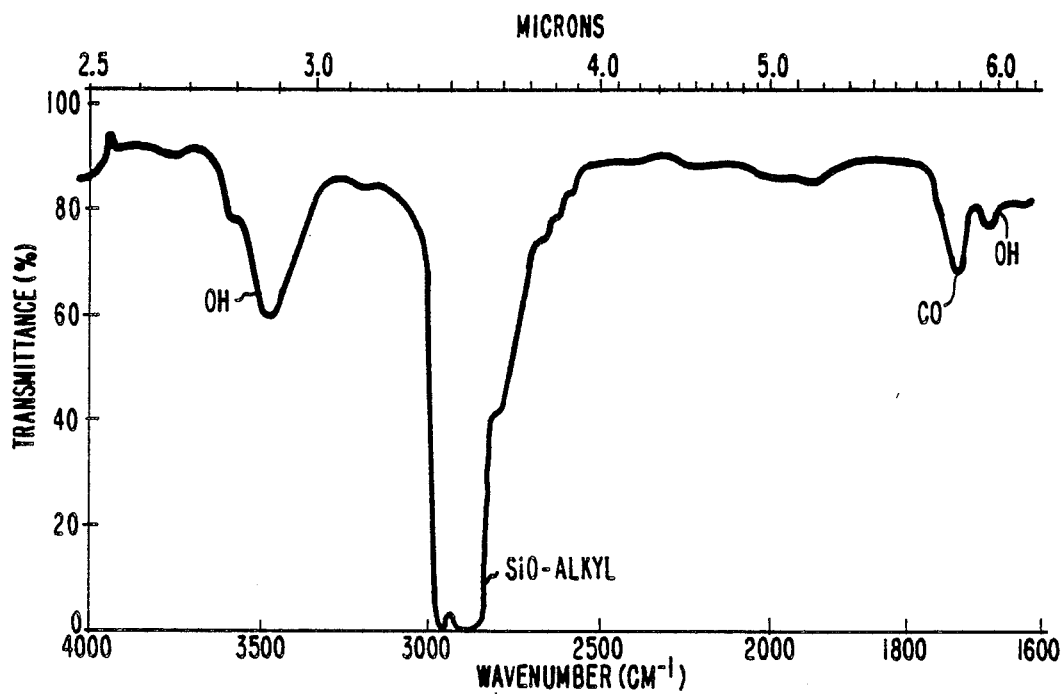
FIG. 1 is an infrared spectrum of an additive of the invention.
Figure 2:
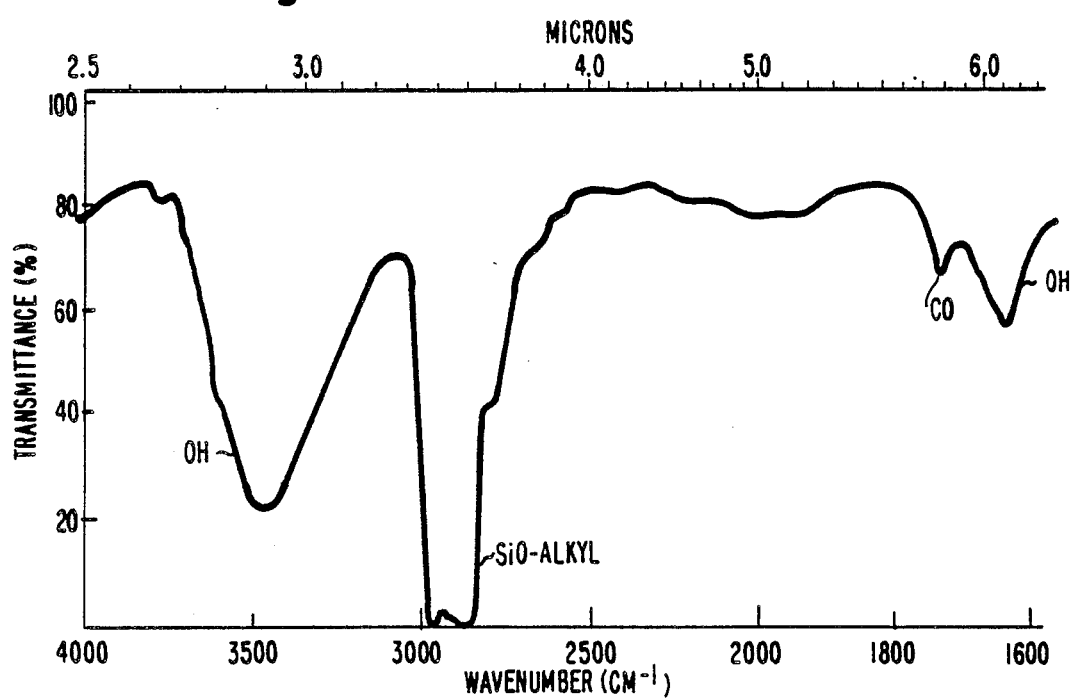
FIG. 2 is an infrared spectrum of an additive of the invention after exposure to moisture.

These materials have a number of characteristics that make them very useful for the present application. They are very low melting materials and remain liquid at all ambient temperatures; they have a low surface tension of about 24 dynes/cm at room temperature and thus have good wettability characteristics for the highly irregular video disc surface; they have low volatility and thus will not evaporate from the disc surface even after long periods of time and/or variations in atmospheric temperature and relative humidity; they are not toxic or flammable; they are insoluble in water. However, they are hydrolyzable materials, which probably accounts for their ability to impart improved moisture resistance to the surface of the disc. This ability to hydrolyze is apparent from the infrared absorption spectra of the pure material, see FIG. 1, and the material after exposure to high relative humidity (12 hours at 100° F. and 95 percent relative humidity), see FIG. 2. Inspection of the spectra show greatly increased OH group absorption at $1635^{cm-1}$ and $3480^{cm-1}$ wave numbers after treatment. This hydrolysis undoubtedly occurs due to the presence of the Si—O—C bond. No further increase in absorption is noted after periods of up to about a week at 100° F. and 95 percent relative humidity exposures, however.

The above alkylene oxide silicone copolymers, when added to methyl alkyl siloxane fractionated lubricants, greatly improves the stability of high density information discs, particularly after exposure of the disc to high temperature and high relative humidity conditions.

The amount of alkylene oxide silicone copolymer added to the lubricant is not critical and the minimum amount that will be effective to reduce carrier distress is preferred. At the present time amounts of from about 10 to about 20 percent by weight of the copolymer in the fractionated methyl alkyl siloxane lubricant has been found to be satisfactory. Larger amounts, up to about 70 percent by weight of the copolymer in the siloxane lubricant can be employed, which reduces the cost of the composite lubricant since the methyl alkyl siloxane is far more expensive than the present dopant material. However, some tracking problems between the disc and stylus were noted at high loadings of silicone copolymer, although lubricity and moisture sensitivity are greatly improved. Amounts of about 20 percent of copolymer in the methyl alkyl siloxane lubricant appear sufficient to reduce stylus wear. Thus the exact amount to be added to the methyl alkyl siloxane fractionated lubricant will be decided by balancing the requirements for reducing moisture sensitivity, improving stylus wear, reducing cost and minimizing tracking problems.

Although the present alkylene oxide silicone copolymers are not soluble in the fractionated methyl alkyl siloxane lubricant, they are dispersible in the lubricant and they can be applied as a uniform composition film on the surface of the disc. Thus the two materials can be mixed together and applied as by spraying from a solvent, e.g., heptane, in which the methyl alkyl siloxane and the alkylene oxide silicone copolymer are soluble, or they can be applied as a uniform composition film directly, as from a mist or fog. In any event application of a film about 200–400 angstroms thick on the surface of the disc is desirable.

The present lubricant system, once applied, is very stable with respect to atmospheric effects and provides high uniformity and reproducibility for high density information discs. The present alkylene oxide silicone copolymers can be molecularly distilled at temperatures of from 50° to about 250° C. under vacuum, when less than 3 percent of volatiles are removed from the silicone. This also indicates that the materials are thermally very stable.

The invention will be further illustrated by the following Examples but the invention is not to be limited to the details described therein. In the Examples parts and percentages are by weight unless otherwise noted.

Carrier distress time is measured by adding the amount of time in seconds (but discounting intervals of less than 10 microseconds) during disc playback when the r.f. output of the player arm is less than 150 millivolts peak to peak and the time when the r.f. output gives above 8.6 megahertz or below 3.1 megahertz in frequency, indicating a defect. Such defects are noted by the viewer as dropouts. The present acceptable level of carrier distress for a video disc is 3 seconds in one hour of playback time.

EXAMPLE 1

A molding composition was prepared by mixing about 78 parts of Geon 110×346 polyvinylchloride of the B. F. Goodrich Company; about 13 parts of a conductive carbon black CSX 175B of the Cabot Company; 2.0 parts of dibutyltin-β-mercaptopropionate commercially available as T35 from M & T Chemical Company, Inc.; 1.0 part of Mark 275 stabilizer of Argus Chemical Co., a dibutyltin maleate stabilizer; 0.75 part of Acryloid K175, an acrylic modifier of Rohm & Haas Company; 1.0 part of calcium stearate; 2.0 parts of diundecyl phthalate and 0.75 part of Loxiol 7109, a mixture of 70 percent by weight of G30 and 30 percent by weight of G70 lubricants of the Henkel International GmbH.

Video discs were compression molded from the above composition at about 360° F. (182.2° C.) The video discs were treated by washing in an aqueous solution and drying to remove any surface contaminants present as a result of the molding process.

Three groups of 12 discs each were treated as follows: control group 1 were sprayed with the fractionated methyl alkyl siloxane as in Formula 1 as a 0.3 percent heptane solution; control group 2 were sprayed with a mixture of the fractionated methyl alkyl siloxane of Formula 1 and 15 percent of a known dopant of the formula

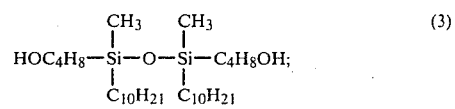

and the Example 1 discs were sprayed with the methyl alkyl siloxane lubricant of Formula 1 containing 20 percent of a dopant of the formula

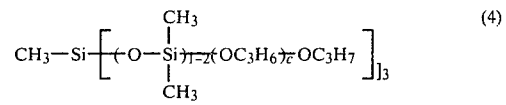

as an oligomeric mixture containing equal parts of c=3 and c=6. This material is commercially available as Silwet 722 TM of Union Carbide Corp.

The discs were played once, carrier distress time for initial play noted and then stressed by storing for 1 hour in a chamber at 100° F. and 95 percent relative humidity and replayed. The data are summarized in Table I below.

TABLE I

| | Carrier Distress, sec./30 min. playback | | | | | |
| | Initial Play | | | After Stress | | |
| Sample | Median | Range | Pass | Median | Range | Pass |
| Control 1 | .09 | .05–1.2 | 11/12 | 2.5 | .09–62.2 | 5/12 |
| Control 2 | .13 | .10–.53 | 12/12 | .31 | .20–.48 | 12/12 |
| Example 1 | .10 | .07–.38 | 12/12 | .37 | .09–2.8 | 11/12 |

It is apparent that discs treated according to the present invention performed better after stressing than use of the methyl alkyl siloxane lubricant alone and was comparable to the lubricant containing a known dopant.

EXAMPLE 2

A second group of six discs, fabricated according to the procedure of Example 1, were sprayed with the methyl alkyl siloxane fractionated lubricant containing 20 percent of the dopant of Example 1 and stressed by maintaining in a low humidity chamber at 75° F. and 10 percent relative humidity for 24 hours and replayed.

The median carrier distress was 0.07 second, the range was 0.05 to 0.08 second and all six discs passed the carrier distress criteria.

EXAMPLE 3

A first group of discs made by the procedure of Example 1 from three separate pressings were spray coated with a mixture of fractionated methyl alkyl siloxane of Formula 1 containing 20 percent of the dopant of Example 1 as a 0.3 percent solution in heptane. A second group of discs were coated from a mixture of the two materials as a fine mist of the two lubricants. The results are given below in Table II.

TABLE II

| | Carrier Distress, sec./30 min. playback | | | | | |
| --- | --- | --- | --- | --- | --- | --- |
| | Initial Play | | | After Stress | | |
| Sample | Median | Range | Pass | Median | Range | Pass |
| Pressing I | | | | | | |
| Group I | .17 | .10–.51 | 12/12 | .17 | .07–.58 | 12/12 |
| Group II | .20 | .10–.30 | 12/12 | .23 | .11–3.2 | 11/12 |
| Pressing II | | | | | | |
| Group I | .13 | .08–1.5 | 12/12 | .18 | .10–2.5 | 11/12 |
| Group II | .19 | .11–.50 | 12/12 | .44 | .11–5.4 | 10/12 |
| Pressing III | | | | | | |
| Group I | .17 | .09–.22 | 12/12 | .23 | .13–1.1 | 12/12 |
| Group II | .11 | .07–.25 | 12/12 | .22 | .12–1.0 | 12/12 |

It is apparent that substantially similar results were obtained in all cases.

Thus, discs sprayed with the fractionated methyl alkyl siloxane lubricant and a known dopant and with a lubricant formulation of the present invention are comparable with respect to playback; initially; after high temperature, high relative humidity stressing; and after low relative humidity stressing; and also with respect to stylus wear and tracking behavior. However, since the compared prior art dopant is more expensive, the present combination can reduce the costs of manufacture of high density information discs.

We claim:

1. In a high density information record adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record coated with a methyl alkyl siloxane lubricant having the formula

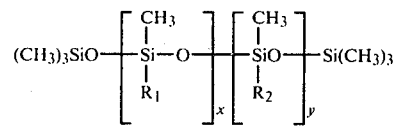

wherein $R_1$ and $R_2$ are alkyl groups of 4–20 carbon atoms, x is an integer of 2–4, y is an integer of 0–2 and wherein the sum of x plus y is 4 or less, the improvement which comprises including in said lubricant an alkylene oxide silicone copolymer of the formula

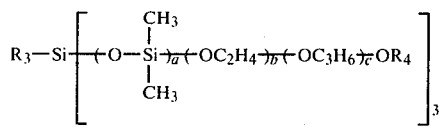

wherein $R_3$ and $R_4$ are lower alkyl, a is an integer of 1–2, b is an integer of 0–2 and c is an integer of 1–6.

2. A record according to claim 1 wherein from about 10 to about 70 percent by weight of the lubricant of the alkylene oxide silicone copolymer is present.

3. A record according to claim 1 wherein $R_2$ is methyl, $R_4$ is ethyl, a is 1–2, b is 0 and c is 3 and/or 6.

4. A record according to claim 1 wherein from about 10 to about 20 percent by weight of the lubricant of the alkylene oxide silicone copolymer is present.

5. A record according to claim 1, 2, 3 or 4 wherein said disc is made of a conductive carbon-containing polymer or copolymer of polyvinylchloride.

* * * * *